(12) United States Patent  
Feng et al.

(10) Patent No.: US 8,782,444 B2  
(45) Date of Patent: Jul. 15, 2014

(54) CIRCUIT PROTECTION SYSTEM AND METHOD FOR A CIRCUIT UTILIZING CHIP TYPE POWER SUPPLY

(75) Inventors: Lan-Yi Feng, Shenzhen (CN); Ying-Bin Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 317 days.

(21) Appl. No.: 13/217,157

(22) Filed: Aug. 24, 2011

(65) Prior Publication Data

US 2012/0290854 A1 Nov. 15, 2012

(30) Foreign Application Priority Data

May 9, 2011 (CN) .......................... 2011 1 0117847

(51) Int. Cl.
*G06F 1/00* (2006.01)
*G05F 1/573* (2006.01)
(52) U.S. Cl.
USPC ........................... 713/300; 713/310; 323/277
(58) Field of Classification Search
USPC ....................................................... 713/300
See application file for complete search history.

(56) References Cited

U.S. PATENT DOCUMENTS

| | | | |
|---|---|---|---|
| 6,218,816 B1 * | 4/2001 | Fritz et al. ..................... | 323/277 |
| 7,366,922 B2 * | 4/2008 | Takeda et al. ................. | 713/300 |
| 7,679,224 B2 * | 3/2010 | Ren .............................. | 307/130 |
| 7,844,808 B2 * | 11/2010 | Westerinen et al. ............. | 713/1 |
| 8,147,138 B2 * | 4/2012 | Shi ................................ | 374/208 |
| 8,255,988 B2 * | 8/2012 | Carpenter ....................... | 726/17 |
| 2009/0021880 A1 * | 1/2009 | Flay et al. ..................... | 361/101 |

* cited by examiner

*Primary Examiner* — Suresh Suryawanshi
(74) *Attorney, Agent, or Firm* — Novak Druce Connolly Bove + Quigg LLP

(57) ABSTRACT

The present disclosure provides a circuit protection system and a circuit protection method for an electronic system. The circuit protection system includes a main chip, a power chip powering the main chip, a basic input/output system (BIOS) and a control unit. The control unit detects the potential of a PW_OK signal output from the power chip to the main chip, and gets the current state of the electronic system through the BIOS, thereby determining whether the current state of the main chip corresponds to a predetermined state for the main chip which defined in the current state of the electronic system. If not, the control unit outputs a signal to disable the main chip. The present disclosure disables the main chip instantly when the voltage provided thereto is excessive or insufficient, thereby avoiding the damage caused by excessive or insufficient voltage.

8 Claims, 2 Drawing Sheets

CIRCUIT PROTECTION SYSTEM AND METHOD FOR A CIRCUIT UTILIZING CHIP TYPE POWER SUPPLY

BACKGROUND

1. Technical Field

The present disclosure relates to a circuit protection system and method, and particularly to a circuit protection system and method for a circuit utilizing chip type power supply.

2. Description of Related Art

In a circuit utilizing a chip type power supply, the power chip pulls down the potential of a PW_OK signal output to the main chip when the voltage output by the power chip is excessive or insufficient, thereby protecting the main chip. However, there is an interval between receiving the low potential PW_OK signal and disabling the main chip. Since the main chip still works during the interval, the main chip could be damaged or destroyed. Thus, there is room for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
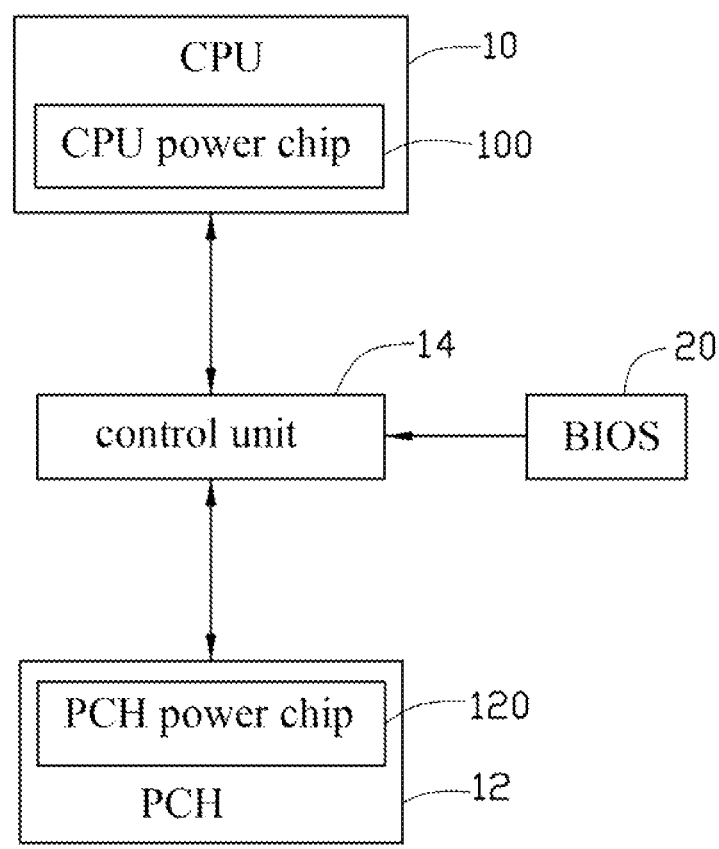
FIG. 1 is a block diagram of an embodiment of a circuit protection system of the present disclosure.

As shown in FIG. 1, the circuit protection system includes a central processing unit (CPU) 10, a CPU power chip 100 for powering the CPU 10, a platform controller hub (PCH) 12, a PCH power chip 120 for powering the PCH 12, a control unit 14, and a basic input/output system (BIOS) 20. The CPU 10, the PCH 12, and the BIOS 20 are connected to the control unit 14.

The advanced configuration and power management interface (ACPI) specification defines six states S0-S5 for an ACPI-compliant computer system. S0 is the working state. S1 is the standby state in which the CPU is disabled while other chips and buses are enabled. S2 is the power standby state in which the CPU and buses are disabled while other chips are enabled. S3 is the suspend to RAM state in which the main memory is powered for retaining the content stored therein while other devices are not powered. S4 is the suspend to disk state in which all content of the main memory is saved to hard disk drive. S5 is the shutdown state in which all devices are disabled.

The circuit protection system is ACPI compatible. To correspond to the ACPI specification, the current state of the system has to be stored in the BIOS 20. Hence, the current state of the circuit protection system can be obtained from the BIOS 20.

In this embodiment, the control unit 14 is a complex programmable logic device (CPLD). The control unit 14 detects PW_OK signals output from the power chips, that is, the CPU power chip 100 and the PCH power chip 120 to determine whether the potential of the PW_OK signals are low. If the potential of the PW_OK signals are low, the control unit 14 gets the current state of the electronic system through the BIOS 20, thereby determining whether the current states of the main chips, that is, the CPU 10 and the PCH 12, correspond to predetermined states (enabled/disabled) for the main chips which defined in each of the current state of the electronic system. In one embodiment, the potential of the PW_OK signal output from the CPU power chip 100 to the CPU 10, detected by the control unit 14 is low, and the current state of the electronic system through the BIOS 20 is S1. Since the CPU 10 should be disabled in state S1 to correspond to the ACPI specification, the CPU power chip 100 have to output a PW_OK signal of low potential to the CPU 10. Hence, the current state of the CPU 10 is considered to correspond to the predetermined state for the CPU 10, which defined in the current state of the circuit protection system. In another embodiment, the potential of the PW_OK signal output from the PCH power chip 120 to the PCH 12 is low, and the current state of the electronic system through the BIOS 20 is S1. Since the PCH 12 should be enabled in state S1 to correspond to the ACPI specification, the PCH power chip 120 has to output a PW_OK signal of high potential to the PCH 12. Hence, the current state of PCH 12 is considered to not correspond to the predetermined state for the PCH 12 corresponding to the current state of the circuit protection system. When inconsistencies within the system cause the PCH power chip 120 to output an incorrect PW_OK signal, for example, the voltage output by the PCH power chip 120 is excessive or insufficient, the control unit 14 correspondingly outputs an enable signal of low potential to the PCH 12, thereby disabling the PCH 12 instantly to avoid damage caused by excessive or insufficient voltage.

Figure 2:
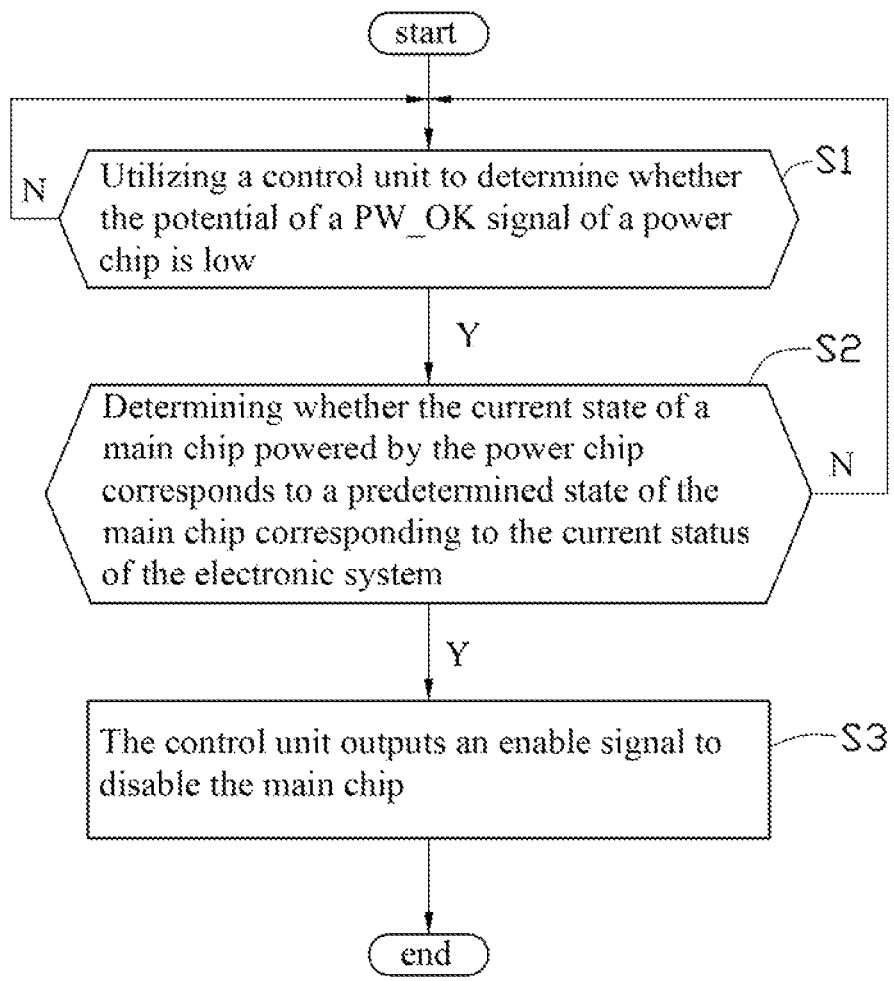
FIG. 2 is a flowchart of an embodiment of a circuit protection method of the present disclosure.

As shown in FIG. 2, the circuit protection method of the present disclosure is as follows. Depending on the embodiment, additional steps may be added, others removed, and the ordering of the steps may be changed.

In step S1, the control unit 14 detects the potential of the PW_OK signals output from the power chip to the corresponding main chip, thereby determining the current state of the main chip powered by the power chip. If the potential of the PW_OK signal output by the power chip is low, step S2 is implemented; otherwise, step S1 is repeated.

In step S2, the correspondence between the current state of the main chip powered by the power chip outputting the PW_OK signal of low potential and the predetermined state for the main chip which defined in the current state of the electronic system is determined. The control unit 14 gets the current state of the electronic system through the BIOS 20. Since the potential of the PW_OK signal output by the power chip determined in step S1 is low, the main chip is disabled. The correspondence between the current state of the main chip and the predetermined state for the main chip which defined in the current state of the electronic system is determined through the current state of the electronic system and the current state of the main chip obtained by the control unit 14. If the current state of the main chip corresponds to the predetermined state for the main chip which defined in the current state of the electronic system, return to step S1; otherwise, step S3 is implemented.

In step S3, the control unit 14 outputs the enable signal to disable the main chip. In step S2, if the current state of the main chip is determined that it does not correspond to the predetermined state for the main chip which defined in the current state of the electronic system, there should be problems cause the power chip to output the PW_OK signal of low potential, for example, the voltage output by the power chip is excessive or insufficient,. Correspondingly, the control unit 14 outputs an enable signal of low voltage to the main chip, thereby disabling the main chip instantly to avoid the damage caused by excessive or insufficient voltage.

The circuit protection system and method of the present disclosure disables the main chip instantly when the voltage output by the power chip is excessive or insufficient, thereby disabling the main chip instantly to avoid the damage caused by excessive or insufficient voltage.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A circuit protection system for an electronic system, comprising:
   at least a main chip;
   a power chip powering the main chip;
   a basic input/output system (BIOS); and
   a control unit connected to the main chip and the BIOS, wherein the control unit detects a first potential of a PW_OK signal output from the power chip to the main chip, and gets the current state of the electronic system through the BIOS, the control unit further determines a second potential of the PW_OK signal with respect to a predetermined state for the main chip defined in the current state of the electronic system, thereby outputting a signal to disable the main chip when the first potential of the PW_OK signal does not correspond to the second potential of the PW_OK signal.

2. The circuit protection system of claim 1, wherein the main chip includes a central processing unit (CPU) and the power chip includes a CPU power chip.

3. The circuit protection system of claim 1, wherein the main chip includes a platform controller hub (PCH) and the power chip includes a PCH power chip.

4. The circuit protection system of claim 1, wherein the control unit is a complex programmable logic device (CPLD).

5. The circuit protection system of claim 1, wherein the potential of the signal output by the control unit is low.

6. The circuit protection system of claim 1, wherein the circuit protection system is advanced configuration and power management interface (ACPI) compatible.

7. A circuit protection method for an electronic system comprising the following steps:
   utilizing a control unit to detect a first potential of a PW_OK signal of a power chip, thereby determining the current state of a main chip powered by the power chip;
   if the potential of the PW_OK signal is low, the control unit gets the current state of the electronic system through a BIOS, the control unit further determines a second potential of the PW_OK signal with respect to a predetermined state for the main chip defined in the current state of the electronic system, thereby determining whether the first potential of the PW_OK signal corresponds to the second potential of the PW_OK signal; and
   if the first potential of the PW_OK signal does not correspond to the second potential of the PW_OK signal, the control unit outputs a signal to disable the main chip.

8. The circuit protection method of claim 7, wherein the potential of the signal output by the control unit is low.

* * * * *